United States Patent [19]

Murphy et al.

[11] Patent Number: 4,696,660
[45] Date of Patent: Sep. 29, 1987

[54] TRACTOR DRIVE SHAFT SHIELD ASSEMBLY

[75] Inventors: Kenneth E. Murphy, Dike; Ronald A. Martin, Cedar Falls; Gary M. Nies, Waterloo, all of Iowa

[73] Assignee: Deere & Company, Moline, Ill.

[21] Appl. No.: 642,026

[22] Filed: Aug. 20, 1984

[51] Int. Cl.⁴ .............................................. F16C 1/26
[52] U.S. Cl. ..................................... 464/170; 74/609
[58] Field of Search ................ 74/608, 609, 612; 180/75.2, 900; 464/170, 177, 179, 182, 7, 172

[56] References Cited

U.S. PATENT DOCUMENTS

| | | | |
|---|---|---|---|
| 2,772,549 | 12/1956 | Harrington | 74/612 X |
| 2,984,090 | 5/1961 | Bennett | 464/170 X |
| 3,161,253 | 12/1964 | Burton | 180/75.2 |
| 3,344,618 | 10/1967 | Young . | |
| 3,418,828 | 12/1968 | Carns . | |
| 3,504,508 | 4/1970 | Bornzin . | |
| 3,868,833 | 3/1975 | Noe et al. | 464/170 X |
| 3,998,290 | 12/1976 | Sivers et al. | 180/75.2 |
| 4,130,998 | 12/1978 | Einsel et al. | 464/7 |
| 4,308,931 | 1/1982 | Khanna | 464/170 X |
| 4,435,166 | 3/1984 | Bondioli | 464/172 |

FOREIGN PATENT DOCUMENTS 224462  11/1962  Austria .................................. 464/170

OTHER PUBLICATIONS

John Deere Werke, Mannheim, "Marketing Information-Anti-Wrapping Guard on MFWD Drive Shaft 4040S & 4240S Tractor Models", 7/83, #27/83.
John Deere Tractor Works, "Instructions for Installation of Mechanical Front Wheel Drive Shaft Rear Universal Joint Shield", 1/84, #R-84-1.
Deere & Co., "Fundamentals of Service-Power Take-Off", 1979, pp. 9-5 and 9-6.

Primary Examiner—Daniel P. Stodola

[57] ABSTRACT

A shield assembly for the front drive line of a mechanical front-wheel drive tractor includes a one-piece, non-telescoping shield which covers the full length of the drive line and its U-joints. The shield receives and is supported by a quill at its rear end and is supported and received by a ring at its front end. The ring has brackets for bolting to the tractor front axle housing. Covers prevent debris from entering the front end of the shield.

2 Claims, 15 Drawing Figures

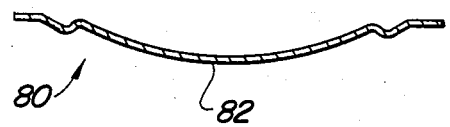
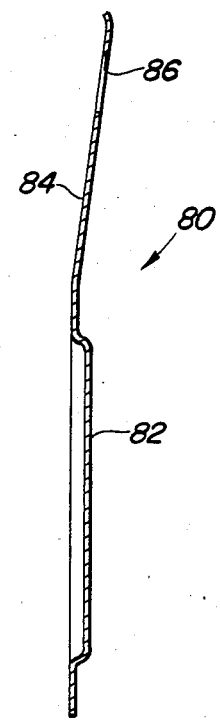
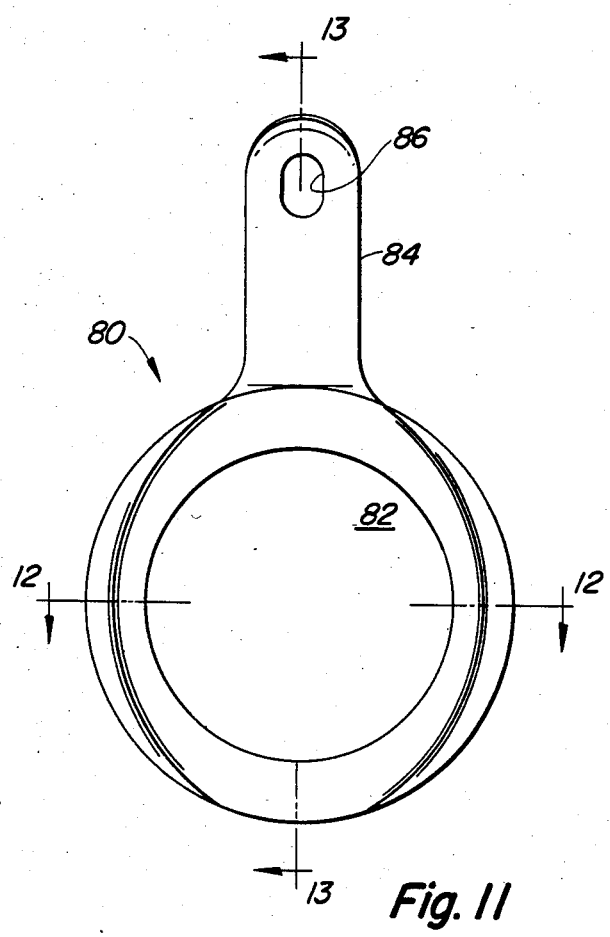

TRACTOR DRIVE SHAFT SHIELD ASSEMBLY

BACKGROUND OF THE INVENTION

This invention relates to a shield assembly for the drive shaft of a vehicle, such as the front drive shaft in a mechanical, four-wheel drive agricultural tractor.

It is known to protect tractor drive shafts with telescoping shields. Such shields can suffer deformation which interferes with or prevents their telescopic action. Contamination from dirt or debris can also interfere with their telescopic action.

It is known to shield the front and rear U-joints at opposite ends with separate shields. This leaves a substantial portion of the drive shaft exposed between the separate shields. Crop material can then become tightly wrapped around the exposed portion of the drive shaft with the possibility of this rotating mass damaging the adjacent portions of the shields. Furthermore, dirt and mud can still be forced inside the rear shield through the small annular space between the drive shaft and the front end of the rear shield. This can adversely affect any seals or bearings which are inside the shield.

SUMMARY OF THE INVENTION

It is an object of the present invention to provide a one-piece drive shaft shield which is not subject to failure of telescopic action.

Another object of the present invention is to provide a shield assembly which protects the entire drive shaft and its U-joints.

A further object of this invention is to provide a drive line shield with easily accessible lube openings.

These and other objects are achieved by the present invention which includes a one-piece, non-telescoping drive shaft shield. The shield is supported at the rear end by a cylindrical quill which is attached to a front end of the clutch housing of the vehicle and which is received by the shield. The front end of the shield is received and supported by a ring. The ring is rigidly fixed to a front axle housing by means of brackets which are fixed to the sides of the ring. Covers are bolted to the brackets to prevent debris from entering an annular space at the front end of the drive shaft. A stop fixed to the quill engages a notch on the rear end of the shield to hold the shield in place with its lube access holes facing upwardly.

BRIEF DESCRIPTION OF THE DRAWINGS

FIG. 11 is a top view of a lube access hole cap of the present invention.

FIGS. 12 and 13 are sectional views taken along lines 12—12 and 13—13, respectively, of FIG. 11.

DETAILED DESCRIPTION

Figure 1:
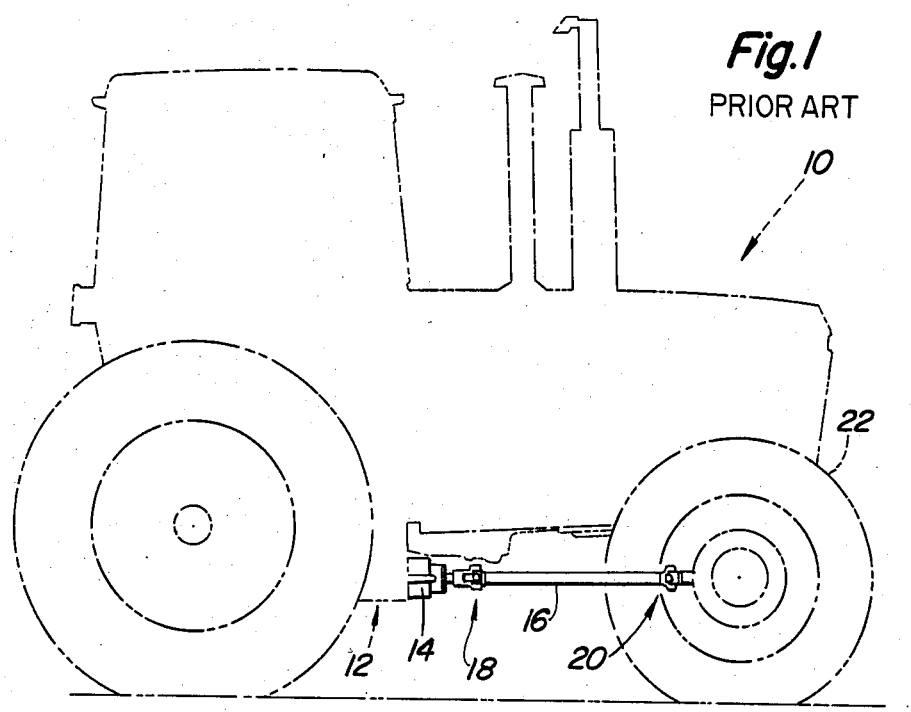
FIG. 1 is a side view of a lower portion of a known mechanical front-wheel drive agricultural tractor with a front drive shaft.

A conventional, mechanical four-wheel drive agricultural tractor 10, such as a Model 4450 manufactured by Deere & Company, includes a clutch housing 12, a portion 14 of which encloses a clutch (not shown). A conventional drive line 16, with rear and front U-joints 18 and 20, transmits torque to the front wheels 22 via a conventional front end gear (not shown) and front axle 24 which are supported by front axle housing 26.

Figure 4:
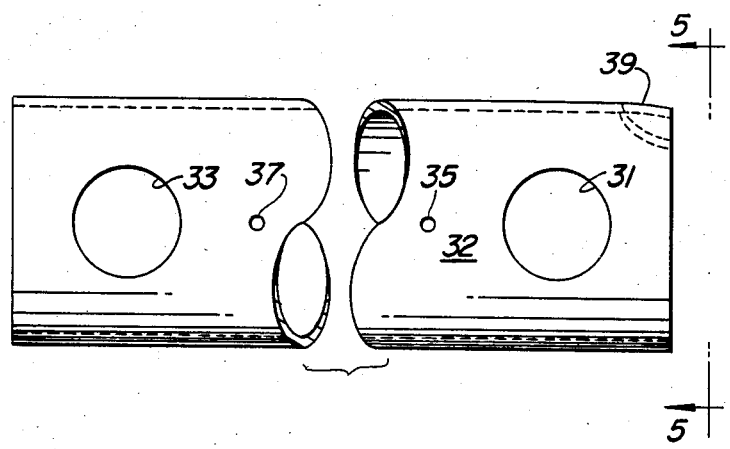
FIG. 4 is a top view of the one-piece shield of the present invention.
Figure 5:
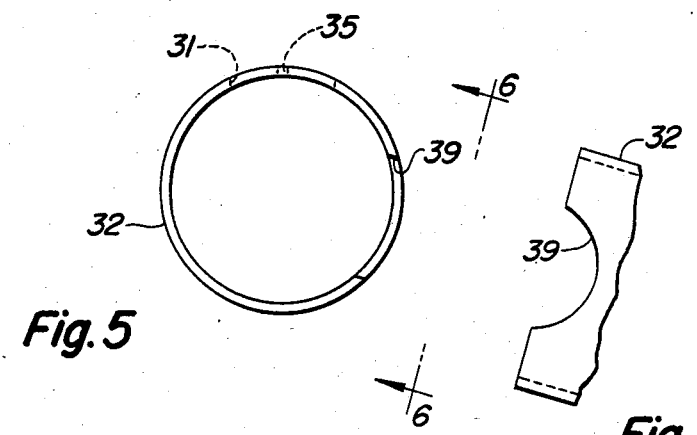
FIG. 5 is an end view of the rear end of the shield of FIG. 4.
Figure 6:
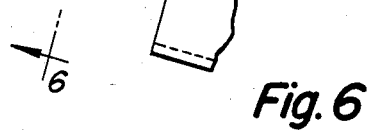
FIG. 6 is a view along lines 6—6 of FIG. 5.

The drive line shield assembly 30 of the present invention includes a one-piece, non-telescopic cylindrical shield 32 (best seen in FIGS. 4-6), which covers and protects the drive line 16 and the U-joints 18 and 20. Preferably, the shield 32 may be constructed of a rigid material such as high density polyethylene. Such a tube may have an inside diameter of 6 inches with a ¼ inch wall thickness, for example. However, if a stronger shield is required, such as for a tractor operating in a rice levee, than a 6-inch diameter, 0.125 inch wall steel tube may be substituted for the plastic shield.

Preferably, the shield 32 has a pair of lube access openings 31 and 33 located near the ends of shield 32 so that the U-joints 18 and 20 can be lubricated therethrough while the shield 32 is in place on the drive line 16. The openings 31 and 33 have associated bolt holes 35 and 37. The rear end of the shield 32 has a semi-circular alignment notch 39.

The shield 32 is slidable over and encloses the full length of the drive shaft 16 and the U-joints 18 and 20.

Figure 7:
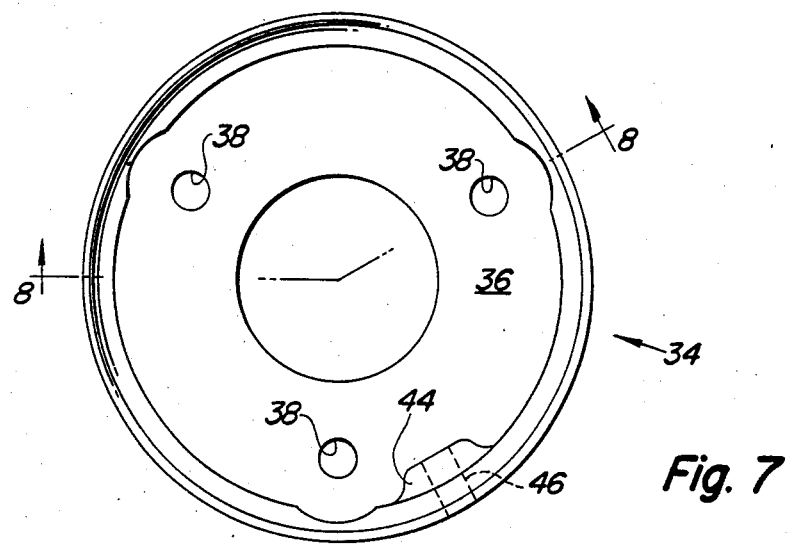
FIG. 7 is an end view of the quill of the present invention.
Figure 8:
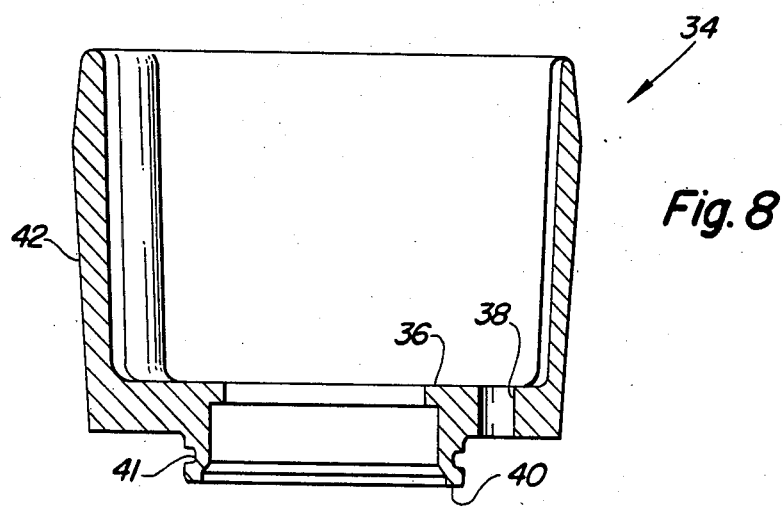
FIG. 8 is a sectional view along lines 8—8 of FIG. 7.

The rear end of the shield 32 receives and is supported by a cylindrical quill 34 which is bolted to the front end of the clutch housing portion 14. As best seen in FIGS. 7 and 8, the quill 34 includes a base 36 with a plurality of bolt holes 38 for bolting the quill 34 to the housing 14. A grooved cylindrical flange 40 with an O-ring groove 41 extends axially from the base 36 for insertion into a corresponding opening in the housing portion 14. An O-ring (not shown) fits in groove 41 to seal between flange 40 and the inside diameter of the housing opening. The quill 34 also includes a tapered cylindrical portion 42 with its smaller diameter portion joined to the base 36. Part of portion 42 includes a thickened portion or boss 44 which surrounds a threaded bore 46. A lip seal (not shown) is pressed into the inside of flange 40 to provide a seal between the flange 40 and the drive shaft which extends therethrough.

Figure 2:
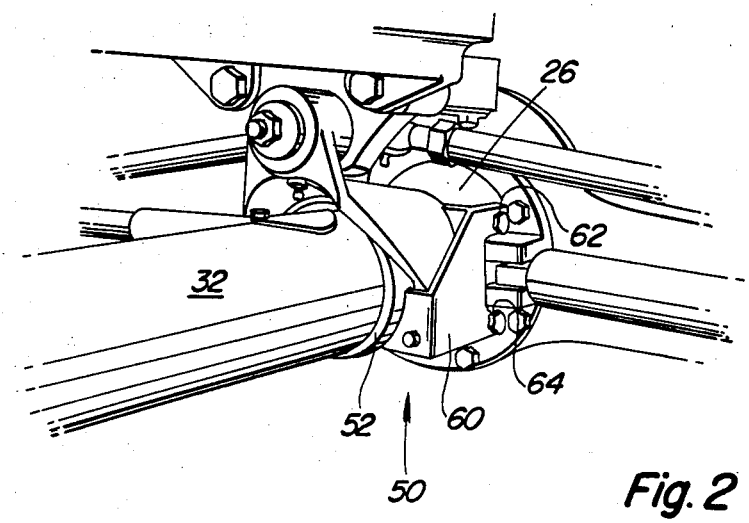
FIG. 2 is a view of the present invention in the region of the front axle.
Figure 3:
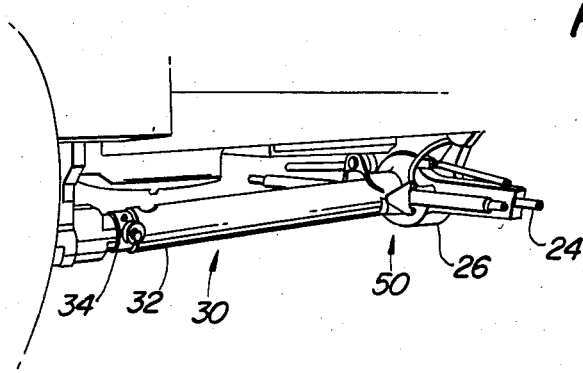
FIG. 3 is a side view of the present invention installed over the front drive shaft of a tractor.
Figure 9:
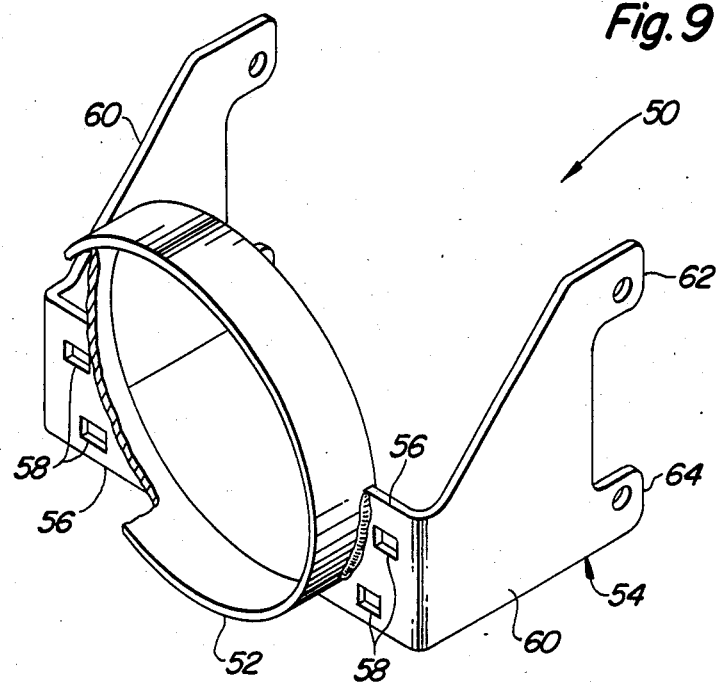
FIG. 9 is an isometric view of the front support of the present invention.
Figure 10:
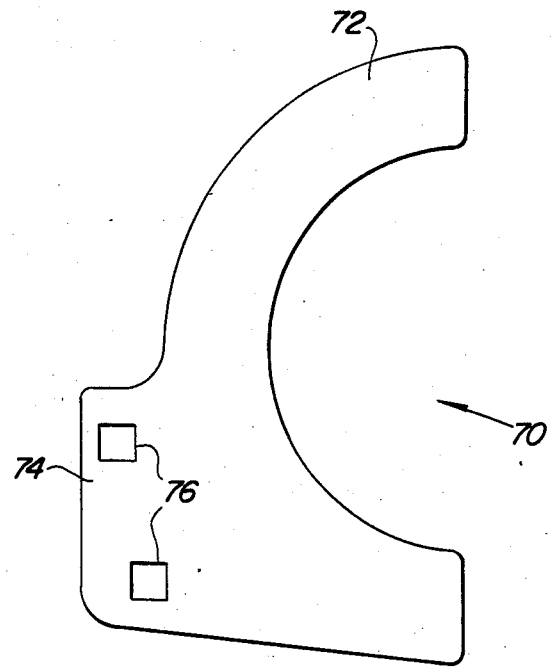
FIG. 10 is a view of one of the covers of the present invention.

The front end of the shield 32 is supported and received by a front support 50. As best seen in FIGS. 9 and 10, support 50 includes a cylindrical ring 52 which slidably receives the front end of shield 32. A pair of brackets 54 are fixed to each side of the ring 52. Each bracket includes a plate 56 with apertures 58. An arm 60 extends perpendicular to each plate 56 and includes a pair of apertured arms 62 and 64. The support 50 may be bolted to the front axle housing 26 by means of the apertured arms 62 and 64, as best seen in FIG. 2.

When the shield 32 is coaxially mounted over the drive line 16, there will be an annular space between the inner surface of shield 32 and the outer surface of drive line 16 or the U-joints 18 and 20. At the front end of shield 32, this space is covered to prevent debris from entering shield 32 by a pair of covers 70, one of which is shown in FIG. 10. Each cover includes an arcuate portion 72 which covers half of the annular space. Each cover also includes a flange portion 74. The flange portion 74 includes apertures 76 which register with apertures 58 of support 50 so that the covers 70 can be bolted to the support 50 in sealing engagement with the front end of the shield 32.

When not in use, the lube openings 31 and 33 in shield 32 are preferably covered by flexible caps 80, as best seen in FIGS. 11-13. The caps 80 are preferably formed out of spring steel and have a dish portion 82 which is received by the opening 31 or 33. Caps 80 also include a leg 84. The leg 84 includes a hole 86 by means of which the caps can be bolted to the shield 32 by bolts received in holes 35 and 37.

In a retro-fit sitation, this shield assembly 30 is installed by first removing the drive line 16. Then, the quill 34 is bolted to the front end of housing portion 14 with the alignment hole 46 positioned about 15 degrees below horizontal to the left when viewed rearward along the axis of drive line 16. Next, the drive line 16 is connected at its rear end to the drive shaft which projects from housing 14. The lube caps 80 may be inserted into openings 31 and 33. Preferably, the legs 84 are bolted to bores 35 and 37, along with washers (not shown), so that the caps 80 can be removed from openings 31 and 33 without unbolting from the shield 32. The shield 32 is then slid over the drive line 16 and over the quill 34 with the notch 39 facing to the rear.

Figure 14:
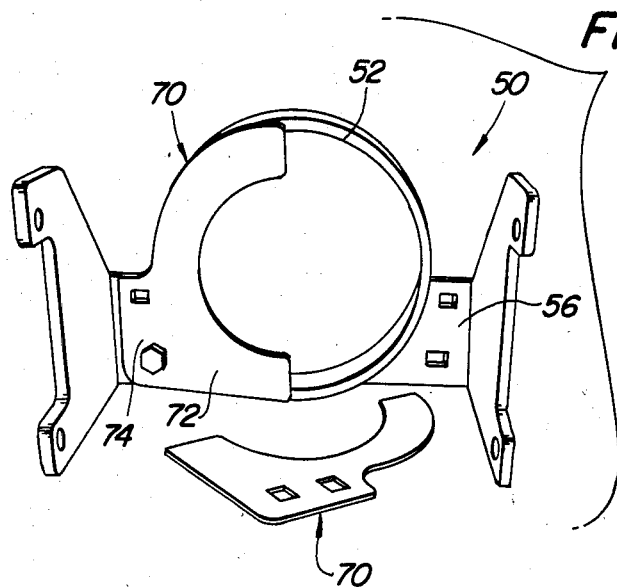
FIG. 14 is a view showing the attachment of the covers of FIG. 10 to the support of FIG. 9.
Figure 15:
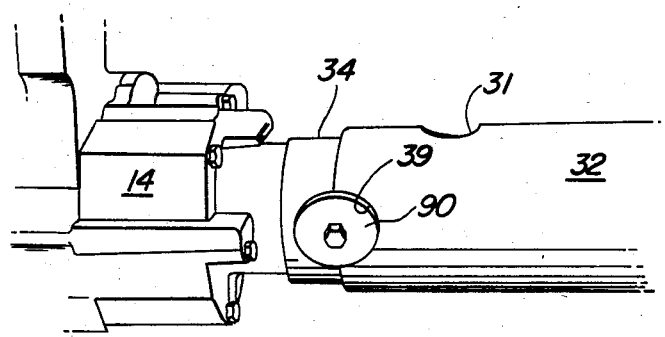
FIG. 15 is a view of the rear region of the present invention.

Next, the front support 50 is mounted around the front end of the shield 32 with the tube slidably received by the ring 52. The front end of drive line 16 is then bolted to a yoke of the front U-joint 20. Then, the apertured arms 62 and 64 of support 50 are bolted to the front axle casting or pivot housing. The next step is to bolt the pair of covers 70 to the front side of the arms 56 of support 50 (as shown in FIG. 14) so that portions 72 thereof cover the annular space between the drive line 16 and the shield 32.

The shield 32 is then slid forward until its front end engages the covers 70. The shield 32 is also aligned so that the lube openings 31 and 33 are located at the top of shield 32 and so that notch 39 is adjacent bore 46 of quill 34. Finally, a warped washer stop 90 is then bolted to quill 34 by means of threaded bore 46 so that the stop engages and is received by notch 39. Thus, the stop 90 and the covers 70 hold the shield 32 axially in place while stop 90 prevents shield 32 from rotating and keeps the lube access openings 31 and 33 at the top of shield 32.

Servicing the drive line U-joints enclosed by a shield assembly 30 is done by loosening the bolt for stop 90 until the stop 90 falls away from the quill 34 about 1/8 inch. The lube caps 80 are preferably rotated 180 degress out of the lube openings 31 and 33. Then, the shield 32 slidably rotates about the drive line 16 and U-joints 18 and 20 until the grease zerks are located and serviced. The lube caps 80 are then rotated back into the lube openings 31 and 33 and the shield 32 slidably rotated so that the notch 39 engages the stop 90. Finally, the bolt for stop 90 is tightened.

While the invention has been described in conjunction with a specific embodiment, it is to be understood that many alternatives, modifications and variations will be apparent to those skilled in the art in light of the aforegoing description. Accordingly, this invention is intended to embrace all such alternatives, modifications and variations which fall within the spirit and scope of the appended claims.

We claim:

1. In a vehicle having a transmission enclosed by a first housing, an axle enclosed by a second housing and a drive shaft connected to the transmission and to the axle via U-joints, a shield assembly comprising:

a cylindrical quill fixed to the first housing;

a support ring fixed to the second housing;

a one-piece, non-telescoping cylindrical shield coaxially surrounding the drive shaft and at least one of the U-joints, the shield having a first end slidably and rotatably engaging and supported by a portion of the quill and a second end slidably and rotatably engaging and supported by the ring, at least one end of the shield having an opening through which lubrication of the at least one U-joint may be achieved, the shield being rotatable from a first position wherein the opening faces upwardly to a second position wherein the opening faces downwardly;

means for releasably holding the shield in its first position while the drive shaft is rotating during normal operation of the vehicle; and means fixed to the support ring for preventing debris from entering the shield at its second end, comprising a pair of arcuate-shaped members, each member having a flange extending therefrom for attachment to a part of the support ring so that the arcuate members extend across an annular space between the shield and the drive shaft.

2. The shield assembly of claim 1, wherein:

the means for releasably holding the shield in its first position comprises a notch in the first end of the sleeve and a washer releasably attached to the quill and engageable with the notch.

* * * * *